United States Patent [19]
Ishibashi et al.

[11] Patent Number: 5,331,051
[45] Date of Patent: Jul. 19, 1994

[54] REACTION INJECTION MOLDING POLYUREA RESIN COMPOSITION

[75] Inventors: Hideo Ishibashi, Neyagawa; Toshiyuki Oshima, Ibaraki; Rie Tamura, Toyonaka; Satoshi Yamamoto, Hirakata; Takaharu Izumo, Osaka, all of Japan

[73] Assignee: Nippon Paint Co., Ltd., Osaka, Japan

[21] Appl. No.: 928,349

[22] Filed: Aug. 12, 1992

[30] Foreign Application Priority Data

Aug. 21, 1991 [JP] Japan .................. 3-235355

[51] Int. Cl.$^5$ .................. C08L 75/02; C08G 18/50
[52] U.S. Cl. .................. 525/131; 525/123; 521/137; 264/328.1; 264/328.2; 264/328.6; 264/328.8
[58] Field of Search .................. 525/123, 131; 264/328.1, 328.6, 328.8, 328.2; 521/137

[56] References Cited

U.S. PATENT DOCUMENTS

| | | | |
|---|---|---|---|
| 4,286,074 | 8/1981 | Davis et al. | 521/137 |
| 4,506,039 | 3/1985 | Ballé et al. | 521/137 |
| 4,532,266 | 7/1985 | Rasshofer et al. | 521/137 |
| 4,536,557 | 8/1985 | Heyman | 521/137 |
| 4,574,137 | 3/1986 | Serratelli et al. | 525/131 |
| 4,575,518 | 3/1986 | Rasshofer et al. | 521/128 |
| 4,902,768 | 2/1990 | Gerkin et al. | 528/85 |
| 5,278,226 | 1/1994 | Ishibashi et al. | 524/714 |

FOREIGN PATENT DOCUMENTS 4015212 1/1992 Japan .................. 525/123

*Primary Examiner*—John Kight, III
*Assistant Examiner*—Rabon Sergent
*Attorney, Agent, or Firm*—Townsend & Banta

[57] ABSTRACT

A polyurea resin molding composition for RIM use comprising (a) polyoxyalkylenpolyamine having an average molecular weight greater than about 400 and a plurality of terminal primary or secondary amino groups, (b) an aromatic polyamine and/or xylylenediamine and (c) a polyisocyanate. The component (a) contains dispersed therein a polymer prepared by the in situ polymerization of at least two different olefinically unsaturated monomers in the presence of a radical polymerization initiator, the ratio of the average amino equivalent of said polyamines (a) and (b) in combination to the average NCO equivalent of said polyisocyanate (c) being between about 1:0.7 to 1:1.5.

8 Claims, No Drawings

REACTION INJECTION MOLDING POLYUREA RESIN COMPOSITION

CROSS REFERENCE TO A RELATED APPLICATION

This is a related application of co-pending application Ser. No. 07/917,396 filed Jul. 23, 1992, now U.S. Pat. No. 5,278,226.

FIELD OF THE INVENTION

This invention relates to a polyurea resin composition for reaction injection molding (hereinafter referred to briefly as RIM) use.

BACKGROUND OF THE INVENTION

Recent years have witnessed a mounting interest in the RIM technology, that is a technology by which an automotive bumper, for instance, is manufactured by simultaneous polyurethane-forming reaction and molding of the resulting resin in a metal mold, and several versions of such technology have been disclosed in, inter alia, U.S. Pat. Nos. 4,254,069, U.S. Pat. No. 3,838,076, U.S. Pat. No. 4,216,543, U.S. Pat. No. 4,246,363 and U.S. Pat. No. 4,269,945.

However, the technology of reacting a polyalkylenepolyol with a polyisocyanate in a mold cavity to give a polyurethane molding in situ not only encountered various difficulties due to the relatively poor heat resistance and coatability of the polyurethane but entailed a high production cost. For this reason, attention was paid to polyurea resins which are more heat-resistant and there has been proposed a technology for producing polyurea moldings which are superior to polyurethane moldings in mechanical strength, heat resistance and other physical properties. This technique comprises reacting a polyoxyalkylenepolyamine having an average molecular weight of at least 1500, an amine terminal chain extender and a polyisocyanate in a closed mold. A method in this category is disclosed in Japanese Patent Application Laid-open No. 188643/83.

One of the important advantages derived from the use of polyurea moldings as automotive parts, such as bumpers, resides in the fact that polyurea parts may be attached to an automotive body before the entire assembly is finished with a thermosetting paint to reduce the number of necessary steps. This may be performed by attaching polyurea exterior parts to the automotive steel body, applying the same thermosetting paint onto the polyurea parts as well as the steel body, and then baking the paint film in all areas simultaneously. Therefore, it is required that the polyurea moldings are not thermally deformable at the baking temperature of conventional automotive coating lines. However, improvements in heat resistance may generally decrease toughness and impact strength, particularly at lower temperatures.

Japanese Patent Application Laid-open No. 143611/89 discloses as a solution to this problem the use of an isocyanate prepolymer produced by reacting a polyisocyanate compound with a hydroxy-, carboxyl-, amino-, or epoxy- terminated liquid polybutadiene in the polyurea RIM. This method, however, suffers from certain defects that the starting liquid polybutadiene is relatively expensive and also too viscous. These defects limit its formulation in the RIM compound to a lower proportion.

Accordingly, a need exists for a polyurea RIM composition which is cost effective and has an improved impact strength while retaining good moldability. The present invention meets this need.

SUMMARY OF THE INVENTION

According to the present invention, there is provided a RIM polyurea resin composition comprising:
(a) a polyoxyalkylenepolyamine having an average molecular weight greater than about 400 and a plurality of terminal primary or secondary amino groups;
(b) an aromatic polyamine and/or a xylylenediamine, and
(c) a polyisocyanate, wherein said polyoxyalkylenepolyamine contains dispersed therein a polymer prepared by the in situ polymerization of at least two different olefinically unsaturated monomers in the presence of a radical polymerization initiator the ratio of the average amino equivalent of said polyamines (a) and (b) in combination to the average NCO equivalent of said polyisocyanate (c) being between about 1:0.7 to 1:1.5.

DETAILED DESCRIPTION OF THE PREFERRED EMBODIMENTS

Polymer Dispersion in Polyoxyalkylenepolyamine

This invention utilizes a polyoxyalkylenepolyamine composition having dispersed therein a polymer of olefinic monomers. This dispersion may be produced by polymerizing two or more olefinically unsaturated monomers in the polyoxyalkylenepolyamine in situ using a conventional radical polymerization initiator. By the use of this dispersion, a RIM polyurea resin composition having an improved impact strength while retaining a satisfactory moldability may be obtained in a cost effective manner. The proportion of the polymer of the olefinically unsaturated monomers is from 5 to 80%, preferably 10 to 50%, by weight of the composition.

The polyoxyalkylenepolyamine used in this invention should have an average molecular weight greater than 400 and a plurality of terminal primary or secondary amino groups. The polyoxyalkylenepolyamine may be produced, for example, by catalytically hydrogenating a corresponding polyoxyalkylenepolyol in the presence of ammonia or a primary amine. See, Japanese Laid Open Patent Application (Kokai) Nos. 204225/86, 278528/86, 38425/90 and 128425/90. Alternatively, it may be produced by reacting the polyoxyalkylenepolyol with acrylonitrile to introduce cyanoethyl group to the terminals followed by reducing the cyanoethyl group to aminopropyl group as disclosed in U.S. Pat. No. 3,496,138.

The polyoxyalkylenepolyol mentioned above can be obtained by subjecting an alkylene oxide to ring-opening polymerization using a basic catalyst, such as an alkali metal hydroxide, in the presence of an appropriate initiator. The starting initiator includes, inter alia, ethylene glycol, diethylene glycol, triethylene glycol and other polyethylene glycols, propylene glycol, dipropylene glycol, tripropylene glycol and other polypropylene glycols, glycerol, diglycerol, pentaerythritol, sorbitol, sucrose and other polyhydric alcohols, bisphenol A, bisphenol S, resol and other polyphenols, and various amines such as diethanolamine, triethanolamine and so on. As regards the alkylene oxide mentioned above, ethylene oxide, propylene oxide, butylene oxide, tetrahydrofuran, etc. can be used independently or in an optional combination. The average molecular weight range of polyoxyalkylenpolyol is 200 to 10,000 and preferable 400 to 8,000.

Many polyoxyalkylenepolyamines are commercially available. For example, Jeffamine D-2000 (Texaco Chemical, amine equivalent ca.1000 ) is a polyoxypropylenediamine and Texrim TR-5050 (ditto, amine equivalent ca.1930) and Jeffamine T-403 (ditto, amine equivalent ca.160) are polyoxypropylenetriamines. All of such commercial polyoxyalkylenepolyamines can be used with advantage in this invention.

Monomers used for the in situ polymerization in polyoxyalkylenepolyamine may be of the general formula: $CH_2=CR-Y$, wherein R is hydrogen, halogen or methyl, and Y is an electron attracting group such as a carboxylate ester residue, a ketone residue, cyano, an unsubstituted or substituted amide residue, sulfonic acid group, sulfonate ester residue, or a halogen atom; or an aryl group such as phenyl. Examples thereof include acrylic acid, various acrylate esters, acrylamide, acrylonitrile, methacrylic acid, various methacrylate esters, methacrylamide, methacrylonitrile, vinyl chloride, vinylidene chloride, styrene, α-methylstyrene, divinylbenzene, ethyl vinyl ketone, ethyl vinyl sulfone, ethyl vinylsulfonate and so on.

One of said at least two monomers (hereinafter referred to as "first monomer") is a monofunctional acrylate monomer whose homopolymer has a glass transition temperature (Tg) below −20° C., preferably below −50° C. and a solubility parameter (SP) between 9.2 and 10.5. Examples of monomers which give a homopolymer having a Tg below −50° C. include n-propyl acrylate, n-butyl acrylate, n-pentyl acrylate, n-hexyl acrylate, n-heptyl acrylate, n-octyl acrylate, 2-ethylhexyl acrylate, 3-methoxypropyl acrylate, 2-ethoxyethyl acrylate, 2- (2-ethoxyethoxy)-ethyl acrylate, N-octylacrylamide, N-stearylacrylamide, n-decyl methacrylate, n-undecyl methacrylate, lauryl methacrylate and so on. However, not all of these monomers is suitable as the first monomer but their usability also depends on the SP values of their homopolymers. Namely, their homopolymers must have an SP value between 9.2 and 10.5.

The other of said at least two monomers (hereinafter referred to as "second monomer") is either a monofunctional acrylate monomer whose homopolymer has an SP value less than 9.2 or greater than 10.5, or a monofunctional methacrylate monomer.

The solubility parameter at 25° C. of a given homopolymer may be estimated according to the equation:

$$\delta = \left[ \sum_i \Delta e_i / \sum_i \Delta v_i \right]^{\frac{1}{2}}$$

wherein $\Delta e_i$ and $\Delta v_i$ are the atomic and group contribution for the energy of vaporization and molar volume respectively, as proposed in Robert F. Fedors, Polymer Engineering And Science, 14 (2), 147 (1974). Using this equation, the solubility parameter of a substance of known structure may be estimated by substituting known values of $\Delta e_i$ and $\Delta v_i$ of particular atom or group for the $\Delta e_i$ and $\Delta v_i$ in the above equation without need for knowing the molecular weight and density of the substance.

Specific examples of first monomers include ethyl acrylate, n-propyl acrylate, n-butyl acrylate, n-hexyl acrylate, n-octyl acrylate, 2-ethylhexyl acrylate, 2-methoxyethyl acrylate, 2-(2-ethoxyethoxy)ethyl acrylate, methoxytripropyleneglycol acrylate and so on. Surprisingly, homopolymers of these first monomers do not precipitate out but dissolve in the polyoxyalkylenepolyamine upon in situ polymerization thereof.

Specific examples of second monomers include n-decyl acrylate, lauryl acrylate, n-tridecyl acrylate, stearyl acrylate, methyl acrylate, 2-hydroxypropyl acrylate, 2-hydroxyethyl acrylate, methyl methacrylate, n-butyl methacrylate, 2-ethylhexyl methacrylate, lauryl methacrylate, stearyl methacrylate and so on. Homopolymers of these second monomers will precipitate out in polyoxyalkylenepolyamine upon in situ polymerization thereof.

Preferably, the first monomer occupies at least 20% of the aggregate weight of all monomers. By using the first and second monomers in combination in the in situ polymerization, the resulting polymer dispersion does not undergo irreversible phase separation. Preferably, the modified polyamine contains from 10 to 50% by weight of this polymer.

The monomer combination may contain a monomer other than the first and second monomers, such as styrene, divinylbenzene, vinylidene chloride and the like. Monomers of this class may be used in admixture with the second monomer.

The polymerization initiators which may be employed in this invention include the well-known peroxide or azo type free radical initiators. Examples of peroxide initiators include benzoyl peroxide, t-butyl peroxide, lauryl peroxide, t-butyl peroxyoctate, t-butyl peroxypivalate, dicyclohexyl peroxydicarbonate and the like. Examples of azo initiators include 2, 2'-azobisisobutyronitrile, 2, 2'-azobis(2-methylbutyronitrile), 1, 1'-azobis(cyclohexane-1-carbonitrile), dimethyl 2, 2'-azobis(isobutyrate), 2, 2'-azobis(2, 4, 4-trimethylpentane) and the like. Any of these conventional initiators may advantageously be used in the present invention.

The in situ polymerization may be performed in various ways. In a stepwise process, the polyoxyalkylenepolyamine is placed in a reactor and heated to a temperature from 80° C. to 120° C. To this is added the whole quantity of the first monomer having dissolved therein the initiator either at one time or dropwise and allowed to react for a short period of time. Then, the whole quantity of the second monomer free from the initiator is added in a similar fashion and the mixture allowed to undergo the in situ polymerization. The stepwise process may be carried out repeatedly using an aliquot of the first and second monomers in one cycle of alternating addition of monomers when the stability of the resulting dispersion is adversely affected by the addition of the whole quantities of monomers in one cycle of the alternating addition. Alternatively, the second monomer free from the initiator may be added to the heated polyoxyalkylenepolyamine before the first monomer containing the initiator is added thereto. It is also possible for some combination of monomers to be added simultaneously using a premix containing the initiator.

Generally, the above reaction may be carried out in the absence of an organic solvent. However, when some difficulties are encountered in handling e.g. the monomer occurs as solid at the ambient temperature, the monomer may be added in molten state or as a solution in a suitable solvent.

After the reaction, the resulting dispersion may be used as such or after removing the solvent if used in the polyurea RIM.

Aromatic Polyamines

The aromatic polyamine for use in this invention includes, inter alia, 2, 4-diaminotoluene, 2, 6-diaminotoluene, 1-methyl-3, 5-diethyl-2, 4-diaminobenzene, 1-methyl-3, 5-diethyl-2, 6-diaminobenzene (the latter two are also known as diethyltoluenediamine or DETDA), 1, 3, 5-triethyl-2, 6-diaminobenzene, 4, 4'-diaminodiphenylmethane, 3, 5, 3' 5'-tetraethyl-4, 4'-diaminodiphenylmethane, 3, 5-diethylthio-2, 4-toluenediamine and so on. The preferred aromatic polyamines are 2, 4-diaminotoluene, 2, 6-diaminotoluene, 1-methyl-3, 5-diethyl-2, 6-diaminobenzene, 1-methyl-3, 5-diethyl-2, 4-diaminobenzene and 4, 4'-diaminodiphenylmethane, inclusive of mixture of such polyamines as well as corresponding secondary polyamines produced by alkylation or Michael type addition of an ethylenically unsaturated compound having an electron attracting group.

Many such aromatic diamines are commercially available. Thus, for example, Etacure 100 (Asano Chemicals) is a mixture of 1-methyl-3, 5-diethyl-2, 4-diaminobenzene and 1-methyl-3, 5-diethyl-2, 6-diaminobenzene, Tolylenediamine (Mitsui Toatsu Chemicals)is 2, 4-diaminotoluene and MDA-220 (Mitsui Toatsu Chemicals) is 4, 4'-diaminodiphenylmethane.

Xylylene Diamine

While xylylenediamine may occur as 1, 2-, 1, 3- and 1, 4-isomers, any of these isomers and any mixture of them may be used in this invention.

The xylylenediamine for use in this invention can be prepared by hydrogenating the corresponding dinitrile in the presence of a nickel of cobalt catalyst. Such a xylylenediamine is commercially available under the tradename of Showamine X (Showa Denko).

Again, corresponding secondary xylylenediamines produced by alkylation or Michael type addition of an ethylenically unsaturated compound having an electron attracting group may be used.

Polyisocyanates

A variety of polyisocyanates can be employed for the purposes of the invention. Among typical aromatic polyisocyanates are carbodiimide-type liquid diphenylmethane diisocyanate or diphenylmethane diisocyanate partial prepolymer, 2, 4-tolylene diisocyanate, 2, 6-tolylene diisocyanate, diphenylmethane-4, 4'-diisocyanate, xylylene diisocyanate, crude tolylene diisocyanate, polymethylenepolyphenyl polyisocyanates, etc. and these polyisocyanates may be in the form of carbodiimides or biurets. A particularly preferred aromatic polyisocyanate is pure methylenebis (4-phenyl isocyanate) (hereinafter referred to MDI) or a prepolymer or modification product thereof.

These compounds can be used for the production of satisfactory RIM moldings. Pure MDI is a solid and, therefore, is often found to be inconvenient in use. Accordingly, liquid preparations based thereon are frequently used and such preparations are subsumed in the concept of MDI, that is methylenebis (4-phenyl isocyanate). U.S. Pat. No. 3,394,164 discloses examples of liquid MDI. Moreover, uretonimine-modified MDI is also included in the above definition. As commercial products of this type, Millionate MTL and Millionate MTL-C are available from Nippon Polyurethane Industry Co., Ltd.

The aliphatic or alicyclic polyisocyanate for use in this invention includes, inter alia, dicyclohexylmethane-4, 4'-diisocyanate, isophorone diisocyanate, hexamethylene diisocyanate, hydrogenated xylylene diisocyanate, etc. and the corresponding isocyanurates and carbodiimides. The more beneficial aliphatic or alicyclic polyisocyanate is in the form of pure hexamethylene diisocyante (HMDI) or an HMDI prepolymer. As commercial products of this type, there may be mentioned Coronate HX and Coronate HK from Nippon Polyurethane Industry Co., Ltd. and Sumidur N3200 from Sumitomo Bayer Urethane Co., Ltd.

Polyurea Resin Composition

The invention provides a RIM composition for the manufacture of polyurea moldings, which features favorable moldability (particularly flow) and impact strength characteristics.

To obtain such a RIM composition, it is preferable to insure that the ratio of the average amino equivalent of a mixture of polyamines (a) and (b) to the average NCO equivalent of a polyisocyanate component based on said polyisocyanate (c) (inclusive of a liquid polyisocyanate prepolymer) is 1:0.7 through 1:1.5, preferable 1:0.95 through 1:1.25 and, for still better results, 1:1.01 through 1:1.10.

Compared with the conventional molding composition based on polyoxyalkylenpolyamine free from dispersed polymer particles and an aromatic polyamine, the molding composition of the invention gives moldings having improved toughness and impact strength.

Where necessary, in using the molding composition of the invention for reaction injection molding, there may be incorporated a variety of additives such as surfactants, blowing agents, foam stabilizers, flame retardants, plasticizers, fillers, fungicides, bactericides, reinforcing materials, internal mold releases, antioxidants, weatherability agents and so on in appropriate proportions.

The following examples and comparative examples are intended to illustrate the present invention in further detail and should by no means be construed as defining the metes and bounds of the invention. In the examples, all parts and percents (%) are by weight.

Production Example 1

To 60 parts of Jeffamine D-2000 (Texaco Chemical, bifunctional, amine equivalent 1050, average M.W. 2,000) heated to 80° C. was added a mixture of 6 parts of n-butyl acrylate and 14 parts of lauryl acrylated containing dissolved therein 0.8 parts of 2, 2'-azobisisobutyronitrile at once, and then allowed to react for 3 hours at the same temperature. The polymer in the resulting modified polyamine possessed a molecular weight of about 50,000.

Production Example 2

To 60 parts of Jeffamine D-2000 were added 6 parts of 2-ethylhexyl acrylate containing 0.8 parts of 2, 2'-azobisisobutyronitrile and allowed to react for 5 minutes. Thereafter 34 parts of lauryl acrylate were added dropwise over 30 minutes and allowed to react at 100° C. for additional 3 hours. The polymer in the resulting modified polyamine possessed a molecular weight of about 30,000.

Production Example 3

To 40 parts of Jeffamine T-5000 (Texaco Chemical, trifunctional, amine equivalent 1900, average molecular weight 5000) heated to 80° C. was added a mixture of 10 parts of n-butyl acrylate and 20 parts of stearyl methacrylate containing 0.8 parts of azobisisobutyronitrile at once, and allowed to react for 3 hours at 80° C. The polymer in the resulting modified polyamine possessed a molecular weight of about 50,000.

EXAMPLE 1

80 parts of modified polyamine of Production Example 1 were blended with 40 parts of diethyltolylenediamine (Etacure 100, Asano Chemicals). The blend and 77 parts of Millionate MTL were impingingly injected, by the double injection method, in a mold for RIM under the following conditions.

| | |
|---|---|
| Mold: | 400 mm × 300 mm × 3 mm (thick) |
| Temperature of charge: | 55 ± 2° C. |
| Injection pressure: | 150 ± 20 kg/cm² |
| Injection rate: | ca. 360 cc/sec |
| Mold temperature: | 80 ± 2° C. |

After a retention time of 40 seconds, the molding was taken out and subjected to post curing at 140° C. for 30 minutes. This product was tested for impact strength according to the criteria described below. The results are shown in Table 1.

EXAMPLES 2-3 AND COMPARATIVE EXAMPLES 1-2

Using the formulations shown in Table 1, RIM was carried out under the same conditions as in Example 1 and the resulting products were evaluated as in Example 1. The results are shown in Table 1.

Evaluation of Impact Strength

The test piece was stored in a refrigerator at −30° C. for longer than 2 hours and tested immediately after removal from the refrigerator for impact strength by the drop ball method. Using a ball weighing 1 kg, a judgement was made in terms of the minimum dropping height (in cm) at which (1) the molding appeared not to change, (2) the molding developed cracks, and (3) the molding was crashed, respectively. The greater the better.

TABLE 1

| | Example | | | Comp. Example | |
|---|---|---|---|---|---|
| | 1 | 2 | 3 | 1 | 2 |
| (a)Component(parts) | | | | | |
| Modified polyamine of Production EX. 1 | 80 | 60 | — | — | — |
| Modified polyamine of Production EX. 2 | — | 40 | — | — | — |
| Modified polyamine of Production EX. 3 | — | — | 70 | — | — |
| Jeffamine T-5000 | — | — | — | — | 40 |
| Jeffamine D-2000 | — | — | — | 60 | — |
| Jeffamine T-403 | — | — | 10 | — | 10 |
| (b)Component(parts) | | | | | |
| Etacure-100 | 40 | 40 | 50 | 40 | 50 |
| (c)Component(parts) | | | | | |
| Millionate MTL | 77 | 78 | 70 | 77 | 70 |
| Coronate HX | — | — | 38 | — | 38 |
| Radical polymer content (wt. %) | 10.2 | 14.2 | 12.6 | — | — |
| Impact strength(cm) | | | | | |
| No change | 15 | 30 | 20 | 10 | 5 |
| Cracks | 20 | 40 | 25 | 15 | 10 |
| Crash | 50 | 70 | 40 | 30 | 30 |

What is claimed is:

1. A reaction injection molding polyurea resin composition comprising the reaction product of:
   (a) a polyoxyalkylenepolyamine having an average molecular weight greater than about 400 and a plurality of terminal primary or secondary amino groups,
   (b) an aromatic polyamine and/or xylylenediamine, and
   (c) a polyisocyanate,
   said polyoxyalkylenepolyamine containing dispersed therein a polymer prepared by the in situ polymerization of at least two different olefinically unsaturated monomers in the presence of a radical polymerization initiator,
   the first of said monomers being a monofunctional acrylate monomer whose homopolyer has a glass transition temperature (Tg) below −20° C. and a solubility parameter between 9.2 and 10.5,
   the second of said monomers being a monofunctional acrylate monomer whose homopolymer has a solubility parameter less than 9.2 or greater than 10.5 or a monofunctional methacrylate monomer, the proportion of said first monomer being at least 20% by weight of the entire monomers, the ratio of the average amino equivalent of said polyamines (a) and (b) in combination to the average NCO equivalent of said polyisocyanate (c) being between about 1:0.7 to 1:1.5

2. The composition according to claim 1, wherein the glass transition temperature of the hompolymer of the first of said monomers is below −50° C.

3. The composition according to claim 2, wherein said first monomer is ethyl acrylate, n-propyl acrylate, n-butyl acrylate, n-hexyl acrylate, n-octyl acrylate, 2-ethylhexyl acrylate, 2-methoxyethyl acrylate, 2-(2-ethoxyethoxy)ethyl acrylate or methoxytripropyleneglycol acrylate.

4. The composition according to claim 1, wherein said second monomer is n-decyl acrylate, lauryl acrylate, n-tridecyl acrylate, stearyl acrylate, methyl acrylate, 2-hydroxyethyl acrylate or 2-hydroxypropyl acrylate.

5. The composition according to claim 1, wherein said second monomer is methyl methacrylate, n-butyl methacrylate, lauryl methacrylate or stearyl methacrylate.

6. The composition according to claim 1, wherein said polyoxyalkylenepolyamine contains from 10 to 50% of said polymer based on the aggregate weight of said polyoxyalkylenepolyamine and said polymer.

7. The composition according to claim 1, wherein the proportion of said polymer of olefinically unsaturated monomers is from 5 to 80% by weight of the composition.

8. The composition according to claim 7, wherein said proportion of said polymer is from 10 to 50%.

* * * * *